United States Patent
Shen et al.

(10) Patent No.: US 12,353,049 B2
(45) Date of Patent: Jul. 8, 2025

(54) OPTICAL COMPONENT DRIVING MECHANISM

(71) Applicant: TDK TAIWAN CORP., Taoyuan (TW)

(72) Inventors: Wei-Jhe Shen, Taoyuan (TW); Kai-Po Fan, Taoyuan (TW); Yi-Ho Chen, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 475 days.

(21) Appl. No.: 17/860,864

(22) Filed: Jul. 8, 2022

(65) Prior Publication Data
US 2024/0012265 A1 Jan. 11, 2024

(51) Int. Cl.
*G02B 7/08* (2021.01)
*G02B 27/64* (2006.01)

(52) U.S. Cl.
CPC ............ *G02B 7/08* (2013.01); *G02B 27/646* (2013.01)

(58) Field of Classification Search
None
See application file for complete search history.

(56) References Cited

U.S. PATENT DOCUMENTS

| | | | |
|---|---|---|---|
| 9,544,482 B2 * | 1/2017 | Bang | G02B 7/08 |
| 2019/0238728 A1 * | 8/2019 | Hwang | H04N 23/57 |
| 2021/0173223 A1 * | 6/2021 | Seo | G02B 7/09 |
| 2021/0349329 A1 * | 11/2021 | Minamisawa | G03B 17/12 |
| 2023/0127990 A1 * | 4/2023 | Chen | H04N 23/51 |
| | | | 359/819 |

FOREIGN PATENT DOCUMENTS

CN 213122399 U 5/2021

OTHER PUBLICATIONS

Office Action mailed Sep. 6, 2022 in CN Application No. 202221765326. X, 1 page.

* cited by examiner

*Primary Examiner* — Derek S. Chapel
(74) *Attorney, Agent, or Firm* — MUNCY, GEISSLER, OLDS & LOWE, P.C.

(57) ABSTRACT

An optical component driving mechanism is provided. The optical component driving mechanism includes a first holder, a fixed portion, a first driving assembly, and a support assembly. The first holder is connected to a first optical component having an optical axis. The first holder is movable relative to the fixed portion. The first driving assembly is configured to drive the first holder to move relative to the fixed portion. The first holder is movable relative to the fixed portion via the support assembly.

20 Claims, 8 Drawing Sheets

OPTICAL COMPONENT DRIVING MECHANISM

BACKGROUND OF THE INVENTION

Field of the Invention

The present disclosure relates to an optical component driving mechanism, and more particularly to an optical component driving mechanism having a support assembly.

Description of the Related Art

Thanks to ongoing technological developments, recent electronic devices (such as tablet computers and smartphones) usually include a lens module capable of aiding in photography or recording video, and some are even equipped with dual lens modules, bringing users a wealth of visual enjoyment. However, an image may come out blurry if the user shakes the lens module in the electronic device while using it. To improve image quality, it is increasingly important to design an effectively shockproof lens module. In addition, designers are currently pursuing the miniaturization of such devices, and it is expected that electronic products will be smaller and lighter with each successive generation. Therefore, how to design an optical mechanism with a better optical compensation function and a smaller volume through a special configuration is an important issue.

BRIEF SUMMARY OF THE INVENTION

An optical component driving mechanism is provided. The optical component driving mechanism includes a first holder, a fixed portion, a first driving assembly, and a support assembly. The first holder is connected to a first optical component having an optical axis. The first holder is movable relative to the fixed portion. The first driving assembly is configured to drive the first holder to move relative to the fixed portion. The first holder is movable relative to the fixed portion via the support assembly.

According to some embodiments of the present disclosure, the first holder includes a protruding portion and an extending portion. The extending direction of the protruding portion is perpendicular to the extending direction of the extending portion.

According to some embodiments of the present disclosure, the extending direction of the protruding portion is perpendicular to the optical axis, and the extending direction of the extending portion is parallel to the optical axis.

According to some embodiments of the present disclosure, the first holder further includes another protruding portion. The protruding portion and the another protruding portion are located on two sides of the first driving assembly.

According to some embodiments of the present disclosure, when viewed in a direction that is perpendicular to the optical axis, the height of the extending portion is greater than the height of the protruding portion.

According to some embodiments of the present disclosure, the optical component driving mechanism further includes a second holder. When viewed in a direction that is perpendicular to the optical axis, the extending portion at least partially overlaps the protruding portion and the second holder.

According to some embodiments of the present disclosure, the extending portion includes a groove, and the groove does not contact the support assembly.

According to some embodiments of the present disclosure, the support assembly includes a first support component and a second support component. The first support component and the second support component each extend in a direction that is parallel to the optical axis.

According to some embodiments of the present disclosure, the extending portion has a first contact portion and a second contact portion. The first contact portion contacts the first support component, and the second contact portion contacts the second support component.

According to some embodiments of the present disclosure, the first contact portion is a V-shaped channel.

According to some embodiments of the present disclosure, the first contact portion is a channel, and the first contact portion includes two contact portion surfaces.

According to some embodiments of the present disclosure, an included angle is formed between the contact portion surfaces of the first contact portion.

According to some embodiments of the present disclosure, the second contact portion is a channel. The second contact portion includes a contact portion surface and two surfaces. The second support component contacts the contact portion surface of the second contact portion. The second support component does not contact the surfaces of the second contact portion.

According to some embodiments of the present disclosure, the contact portion surface of the second contact portion and the two surfaces respectively form two included angles with equal angles.

According to some embodiments of the present disclosure, the optical component driving mechanism substantially has a rectangular shape when viewed along the optical axis. The first driving assembly and the support assembly are located on the same side of the optical component driving mechanism.

According to some embodiments of the present disclosure, the shortest distance between the first driving assembly and the optical axis is smaller than the shortest distance between the support assembly and the optical axis.

According to some embodiments of the present disclosure, the optical component driving mechanism further includes a second holder. The bottom of the second holder does not exceed bottom of the fixed portion in the direction of the optical axis.

According to some embodiments of the present disclosure, the first driving assembly includes a first magnetic component, a first coil and a first magnetically permeable component. The first magnetic component is disposed on the fixed portion, and the first coil and the first magnetically permeable component are disposed on the first holder.

According to some embodiments of the present disclosure, the optical component driving mechanism further includes a first circuit member. The first circuit member includes a first portion and a second portion. The first portion and the second portion are disposed on two different sides of the first holder.

According to some embodiments of the present disclosure, the first portion of the first circuit member is disposed between the first coil and the first magnetically permeable component.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

In order to make the purpose, features, and advantages of the present disclosure more obvious and understandable, the following embodiments are specially cited, and the accompanying drawings are used for detailed description. Among them, the configuration of each element in the embodiment is for illustrative purposes, and is not intended to limit the disclosure. In addition, part of the repetition of the reference numbers in the embodiments is for simplifying the description, and does not mean the relevance between different embodiments. The directional terms mentioned in the following embodiments, for example: up, down, left, right, front or back, etc., are only directions for referring to the attached drawings. Therefore, the directional terms used are used to illustrate and not to limit the disclosure.

In addition, relative terms such as "lower" or "bottom" and "higher" or "top" may be used in the embodiments to describe the relative relationship between one element of the illustration and another element. It can be understood that if the illustrated device is turned upside down, the elements described on the "lower" side will become the elements on the "higher" side.

The optical component driving mechanism of the embodiment of the present invention is described below. However, it can be easily understood that the embodiments of the present invention provide many suitable inventive concepts and can be implemented in a wide variety of specific backgrounds. The specific embodiments disclosed are only used to illustrate the use of the present invention in a specific method, and are not used to limit the scope of the present invention. Unless otherwise defined, all terms used here (including technical and scientific terms) have the same meanings commonly understood by the general artisans to whom the disclosures in this article belong. It is understandable that these terms, such as the terms defined in commonly used dictionaries should be interpreted as having a meaning consistent with the relevant technology and the background or context of this disclosure, and should not be interpreted in an idealized or excessively formal way, unless specifically defined herein.

Figure 1:
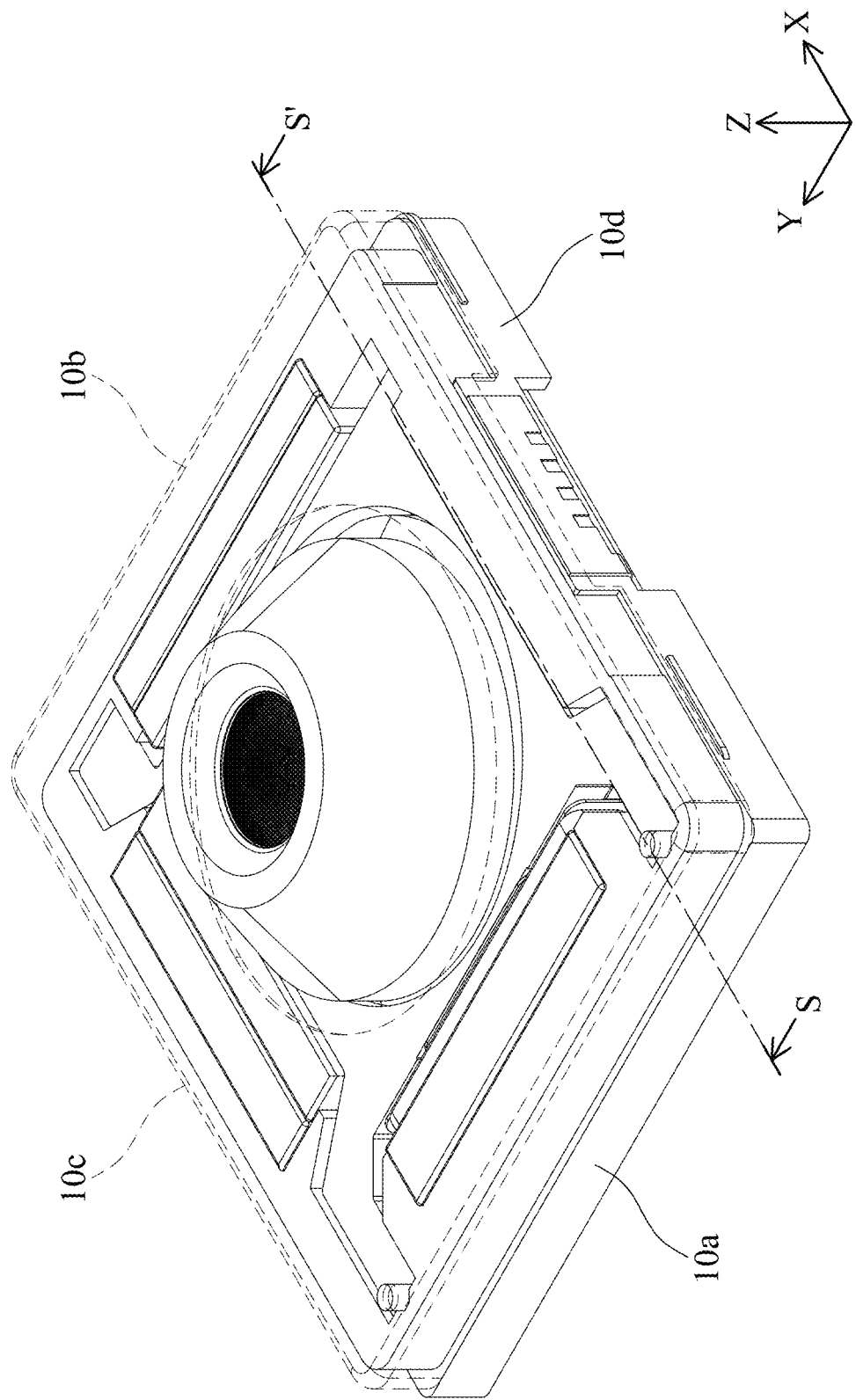
FIG. 1 shows a perspective view of an optical component driving mechanism, according to some embodiments of the present disclosure.

FIG. 1 shows a perspective view of an optical component driving mechanism 10, according to some embodiments of the present disclosure. The aforementioned optical component driving mechanism 10 may be disposed inside an electronic device such as a camera, a tablet computer, or a mobile phone, to obtain images. The aforementioned optical component driving mechanism 10 may relatively move both the first optical component 1 and the second optical component (not shown) disposed therein, so as to achieve the purpose of auto-focusing (AF) and optical image stabilization (OIS). The detailed structure of the optical component driving mechanism 10 is described below.

As shown in FIG. 1, the optical component driving mechanism 10 substantially has a rectangular shape, and the optical component driving mechanism 10 includes a first side 10a, a second side 10b, a third side 10c, and a fourth side 10d.

According to some embodiments of the present disclosure, the first side 10a is opposite to the second side 10b, and the first side 10a and the second side 10b are parallel to each other. According to some embodiments of the present disclosure, the third side 10c is opposite to the fourth side 10d, and the third side 10c and the fourth side 10d are parallel to each other.

Figure 2:
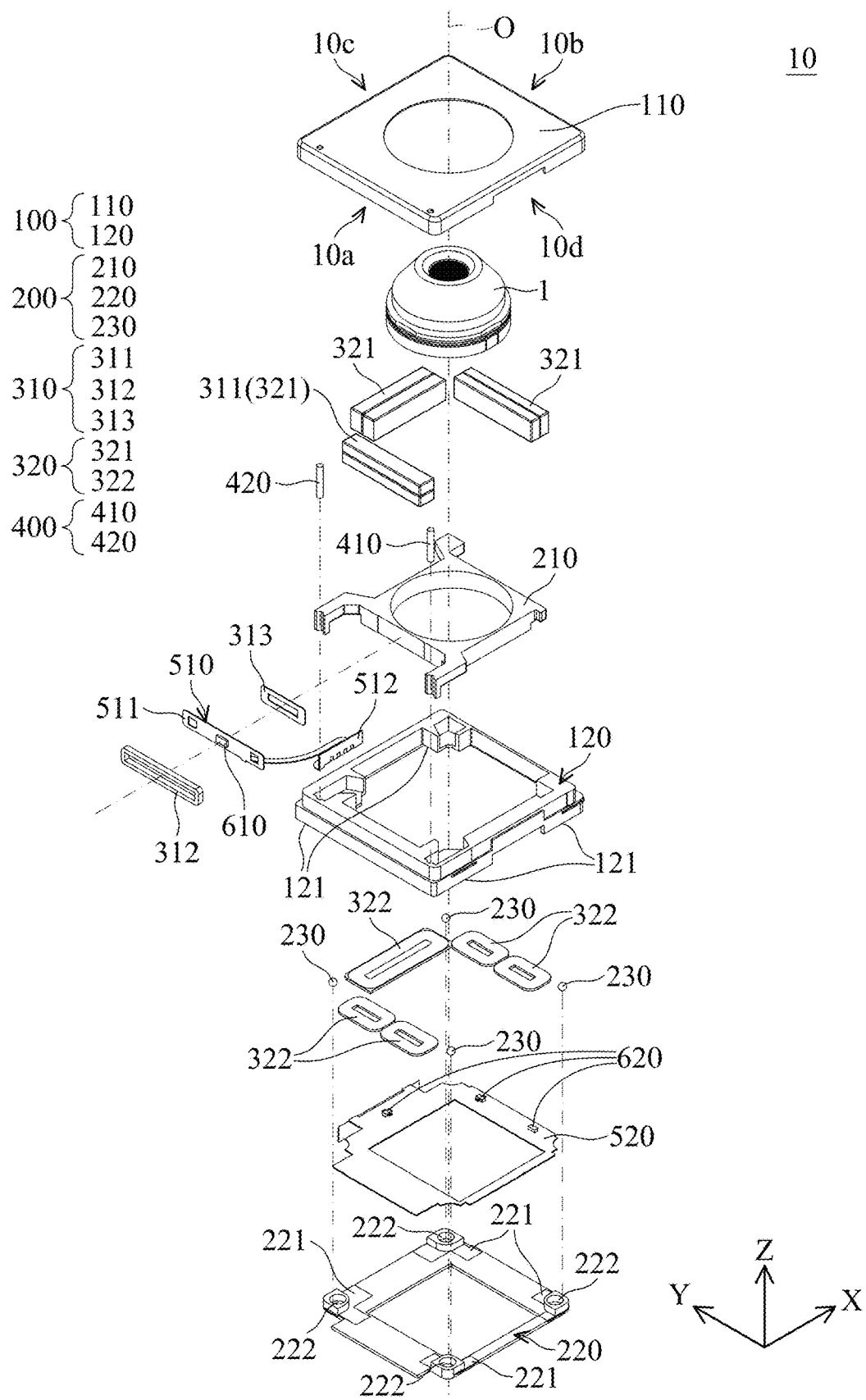
FIG. 2 shows an exploded view of the optical component driving mechanism, according to some embodiments of the present disclosure.

FIG. 2 is an exploded view of the optical component driving mechanism 10, according to some embodiments of the present disclosure. As shown in FIG. 2, the optical component driving mechanism 10 includes a fixed portion 100, a movable portion 200, a first driving assembly 310, a second driving assembly 320, a support assembly 400, a first circuit member 510, a second circuit member 520, a first sensing component 610, and a set of second sensing components 620.

The fixed portion 100 includes a housing 110 and a frame 120. The housing 110 is connected to the frame 120 to form an inner space, and to accommodate other components of the optical component driving mechanism 10. According to some embodiments of the present disclosure, the frame 120 includes a set of frame metal sheets 121, however, the frame metal sheets 121 cannot be seen from the perspective of FIG. 2, the details of which will be described in detail below with respect to FIG. 6.

The movable portion 200 includes a first holder 210, a second holder 220, and a set of the second holder rolling components 230. The first holder 210 fixedly holds the first optical component 1. Therefore, the first optical component 1 will move with the first holder 210 when the first holder 210 moves. The optical component 1 has an optical axis O, and the optical axis O is generally parallel to the Z-axis.

The second holder 220 fixedly holds a second optical component (not shown). According to some embodiments of the present disclosure, the second holder 220 is movable along the X-axis and the Y-axis that are perpendicular to the Z-axis. According to some embodiments of the present disclosure, the second holder 220 may move (rotate) around the optical axis of the second optical component (not shown).

The second holder 220 includes a set of second holder metal sheets 221 and a set of second holder rolling component accommodating portions 222. The second holder rolling components 230 are disposed between the frame 120 and the second holder 220.

According to some embodiments of the present disclosure, the second holder rolling components 230 are each disposed between the frame metal sheet 121 and the second holder metal sheet 221. The second holder rolling components 230 each contacts the frame metal sheet 121 and the second holder metal sheet 221. In this way, damage to the frame 120 and the second holder 220 may be avoided, and the movement of the second holder rolling components 230 may be improved.

According to some embodiments of the present disclosure, the second holder rolling component accommodating portions 222 surround the second holder rolling components 230. In this way, the range of motion of the second holder rolling components 230 may be limited.

The first driving assembly 310 may drive the first holder 210 to move in the optical axis O, so as to perform the auto-focusing function of the optical component driving mechanism 10. According to some embodiments of the present disclosure, the first driving assembly 310 includes a first driving element, a second driving element, and a third driving element. The first driving element includes a first coil 312, the second driving element includes a first magnetic component 311, the third driving element includes a first magnetically permeable component 313. The first magnetic component 311 corresponds to the first coil 312.

As shown in FIG. 2, the first magnetic component 311 is provided on the frame 120 at the first side 10a of the optical component driving mechanism 10. The first coil 312 and the first magnetically permeable component 313 are disposed on the first holder 210 at the first side 10a of the optical component driving mechanism 10, and the first coil 312 is disposed adjacent to the first magnetic component 311.

A magnetic attraction force may be generated between the first magnetically permeable component 313 and the first magnetic component 311. Therefore, when the first holder 210 moves in the optical axis O, the distance between the first holder 210 and the fixed portion 100 in the X-axis remains unchanged, so as to restrain the situation that the first holder 210 is turned over when the first holder 210 is driven.

The second driving assembly 320 may drive the second holder 220 to move along the X-axis and the Y-axis. According to some embodiments of the present disclosure, the second driving assembly 320 may drive the second holder 220 to move (rotate) around the optical axis of the second optical component (not shown).

The second driving assembly 320 includes three second magnetic components 321 and five second coils 322. According to some embodiments of the present disclosure, the second magnetic components 321 correspond to the second coils 322.

As shown in FIG. 2, the three second magnetic components 321 are respectively disposed on the frame 120 at the first side 10a, the second side 10b and the third side 10c of the optical component driving mechanism 10. The second coils 322 are disposed on the second holder 220.

It should be understood that the magnetic component disposed at the first side 10a is the first magnetic component 311 of the first driving assembly 310 and one of the second magnetic components 321 of the second driving assembly 320 at the same time. In this way, the volume of the optical component driving mechanism 10 may be reduced to achieve miniaturization.

According to some embodiments of the present disclosure, the movable portion 200 is movable relative to the fixed portion 100 via the support assembly 400. Both the support assembly 400 and the first driving assembly 310 are located at the first side 10a of the optical component driving mechanism 10. This configuration may assist in maintaining the contact between the first holder 210 and the support assembly 400 when the first holder 210 is driven.

The support assembly 400 includes a first support component 410 and a second support component 420. The first support component 410 and the second support component 420 are two guide rods extending parallel to the optical axis O (Z-axis). Two ends of the first support component 410 and the second support component 420 are respectively fixed to the housing 110 and the frame 120.

When viewed along the X-axis, the first coil 312 is located between the first support component 410 and the second support component 420. When viewed along the optical axis O, the first support component 410 and the second support component 420 are located at two corners of the first side 10a of the optical component driving mechanism 10, respectively.

The first holder 210 is movable relative to the fixed portion 100 via the support assembly 400. Compared with the configuration in which the holder is movably connected with spring sheets in the prior art, the support assembly 400 used in the present invention allows the first holder 210 to hold the optical component 1, which has greater mass and larger size. Therefore, the performance of the optical component driving mechanism 10 is improved.

According to some embodiments of the present disclosure, the first circuit member 510 includes a first portion 511 and a second portion 512. The first portion 511 is disposed between the first coil 312 and the first magnetically permeable component 313 at the first side 10a of the optical component driving mechanism 10, and the first portion 511 is electrically connected to the first driving assembly 310.

The second portion 512 is disposed on the first holder 210 at the fourth side 10d of the optical component driving mechanism 10. The first circuit member 510 may be connected to an external circuit (not shown) through the second portion 512.

According to some embodiments of the present disclosure, in the Z-axis, the second circuit member 520 is disposed between the second coils 322 and the second holder 220. The second circuit member 520 is electrically connected to the second driving assembly 320. The second coils 322 are disposed on the second circuit member 520.

According to some embodiments of the present disclosure, the first sensing component 610 is disposed on the first circuit member 510, and the first sensing component 610 is electrically connected to the first circuit member 510. The first sensing component 610 corresponds to the first magnetic component 311 to sense the position of the first holder 210 relative to the fixed portion 100.

It should be understood that the magnetic component provided at the first side 10a is simultaneously the first magnetic component 311 of the first driving assembly 310 and the reference component for the first sensing component 610. In this way, the magnetic component may perform both driving and sensing functions, and the volume of the optical component driving mechanism 10 may be reduced to achieve miniaturization.

According to some embodiments of the present disclosure, the second sensing components 620 are disposed on the second circuit member 520, and the second sensing components 620 are electrically connected to the second circuit member 520. The second sensing component 620 corresponds to the second magnetic component 321 to sense the position of the second holder 220 relative to the fixed portion 100.

It should be understood that the magnetic components disposed at the first side 10a, the second side 10b, the third side 10c are simultaneously the second magnetic components 321 of the second driving assembly 320 and the reference components for the second sensing components 620. In this way, the magnetic components may perform both driving and sensing functions, and the volume of the optical component driving mechanism 10 may be reduced to achieve miniaturization.

Figure 3:
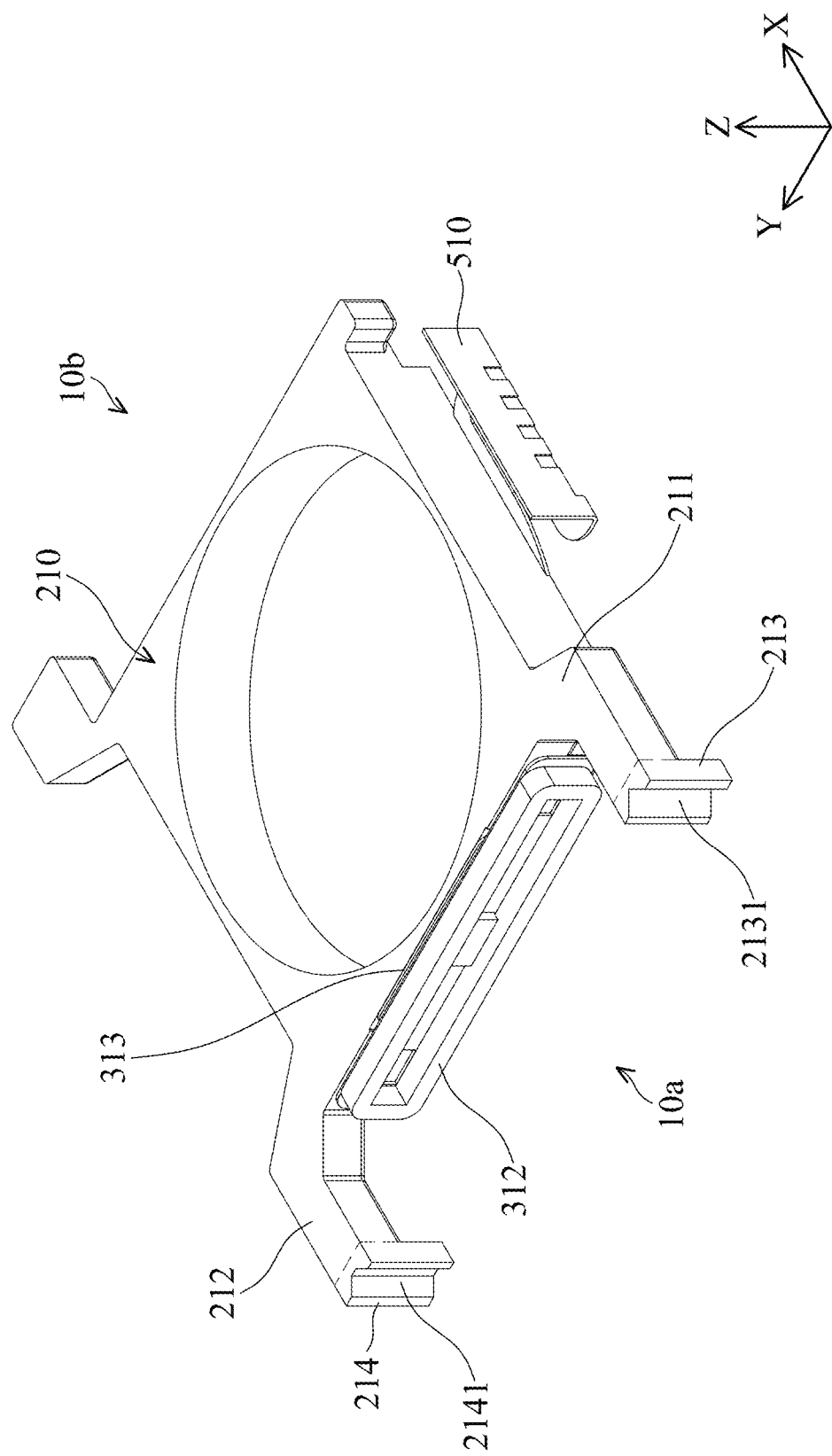
FIG. 3 shows a perspective view of a first holder, a first coil, a first magnetically permeable component, and a first circuit member.

FIG. 3 shows a perspective view of the first holder 210, the first coil 312, the first magnetically permeable component 313, and the first circuit member 510. As shown in FIG. 3, the first holder 210 includes two protruding portions 211, 212 and two extending portions 213, 214.

The two protruding portions 211 and 212 extend toward the −X direction at two corners close to the first side 10a of the optical component driving mechanism 10, respectively. In other words, the protruding portions 211 and 212 are located on two sides of the first coil 312 and the first magnetically permeable component 313, respectively. The two extending portions 213 and 214 extend from the protruding portions 211 and 212 toward the −Z direction, respectively.

The extending directions of the protruding portions 211 and 212 are perpendicular to the extending directions of the extending portions 213 and 214. The extending directions of the protruding portions 211 and 212 are perpendicular to the Z-axis, and the extending directions of the extending portions 213 and 214 are parallel to the Z-axis.

Figure 4:
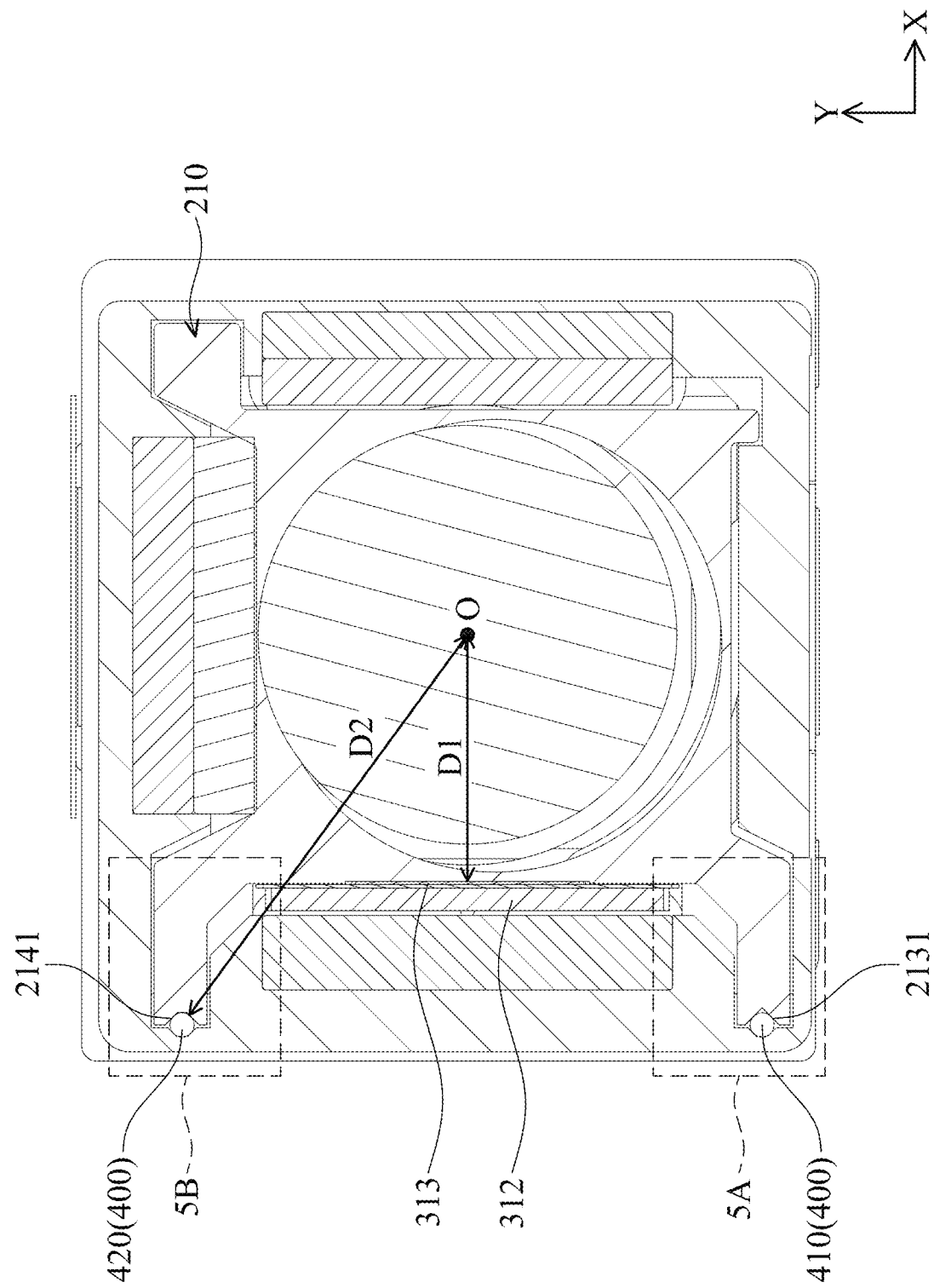
FIG. 4 shows a top view of the optical component driving mechanism, wherein a housing is not shown for illustration purposes.

FIG. 4 shows a top view of the optical component driving mechanism 10, wherein the housing 110 is not shown for illustration purposes. As shown in FIG. 4, the shortest distance D1 between the first magnetically permeable component 313 and the optical axis O is smaller than the shortest distance D2 between the support assembly 400 and the optical axis O. The distance between the first driving element (i.e. first coil 312) and the optical axis is smaller than the distance between the support assembly 400 and the optical axis O.

Referring to FIGS. 3 to 4 together, according to some embodiments of the present disclosure, the extending portion 213 includes a first contact portion 2131. The first contact portion 2131 is a V-shape channel. The first contact portion 2131 contacts the first support component 410 in a manner of providing two bearing surfaces, that is, when viewed along the Z-axis, there are two contact points between the first support component 410 and the first contact portion 2131, the details of which will be described in detail below with respect to FIG. 5A.

The extending portion 214 includes a second contact portion 2141. The second contact portion 2141 is a channel providing a single bearing surface. The second contact portion 2141 contacts the second support component 420 in a manner of providing a single bearing surface, that is, when viewed along the Z-axis, there is a contact point between the second support component 420 and the second contact portion 2141, the details of which will be described in detail below with respect to FIG. 5B.

Figure 5A:
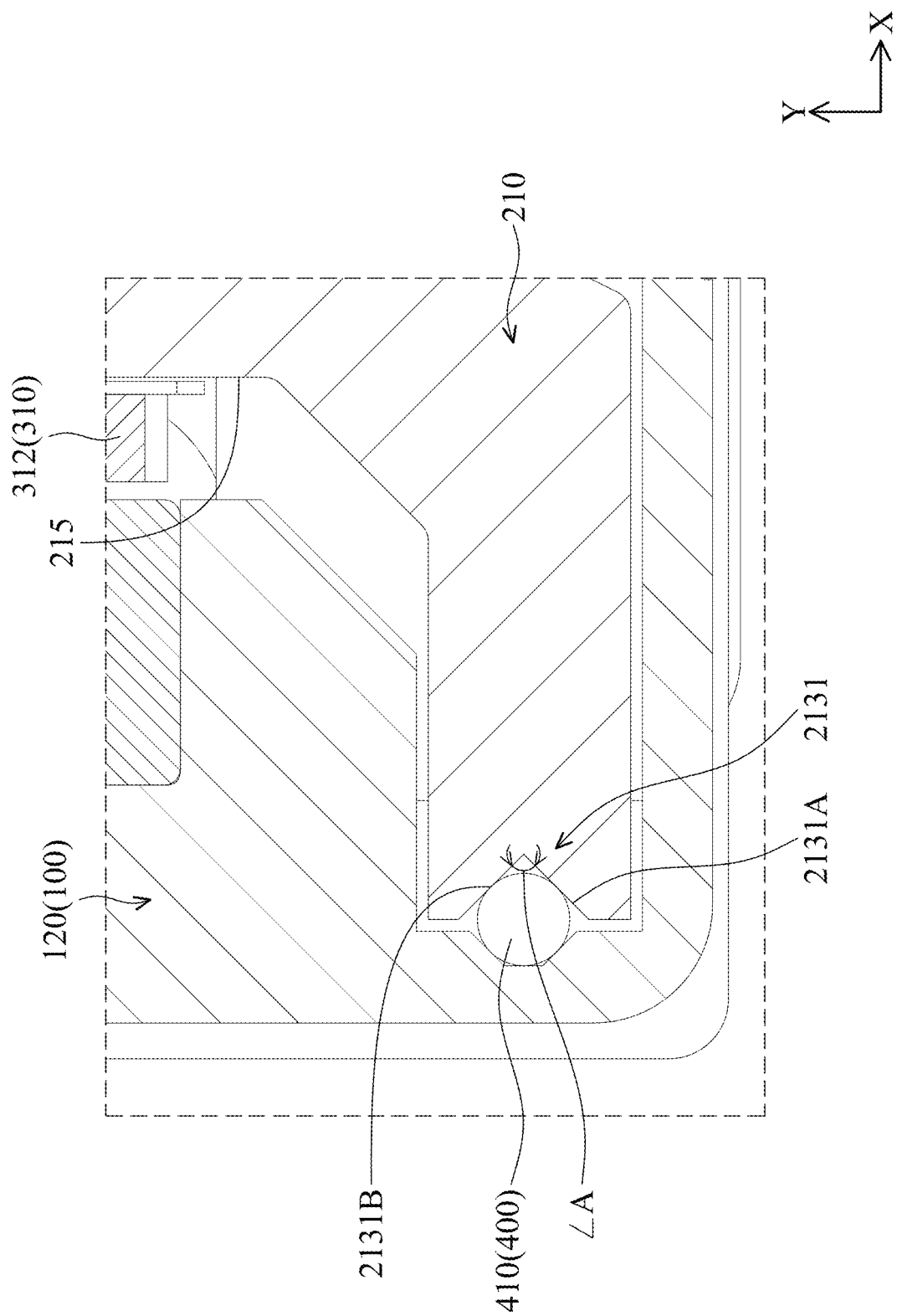
FIG. 5A is an enlarged view taken from block 5A in FIG. 4.

FIG. 5A is an enlarged view taken from block 5A in FIG. 4. As shown in FIG. 5A, the first contact portion 2131 contacts the first support component 410. The first contact portion 2131, which is a channel for accommodating the first support component 410, includes two contact portion surfaces 2131A and 2131B. When viewed along the Z-axis, the first support component 410 has one contact point with the contact portion surface 2131A, 2131B each. An included angle ∠A is formed between the contact portion surfaces 2131A and 2131B. The included angle ∠A may be an angle between 0 and 180° according to design requirements. The first holder 210 includes a first side surface 215, the first driving assembly 310 includes a first driving element (i.e. first coil 312) disposed on the first side surface 215, the normal direction of the first side surface 215 is perpendicular to the optical axis O. When viewed along a direction perpendicular to the normal direction and the optical axis (for example, the positive or negative direction of the Y-axis), the support assembly 400 does not overlap the first driving element (i.e. first coil 312).

Figure 5B:
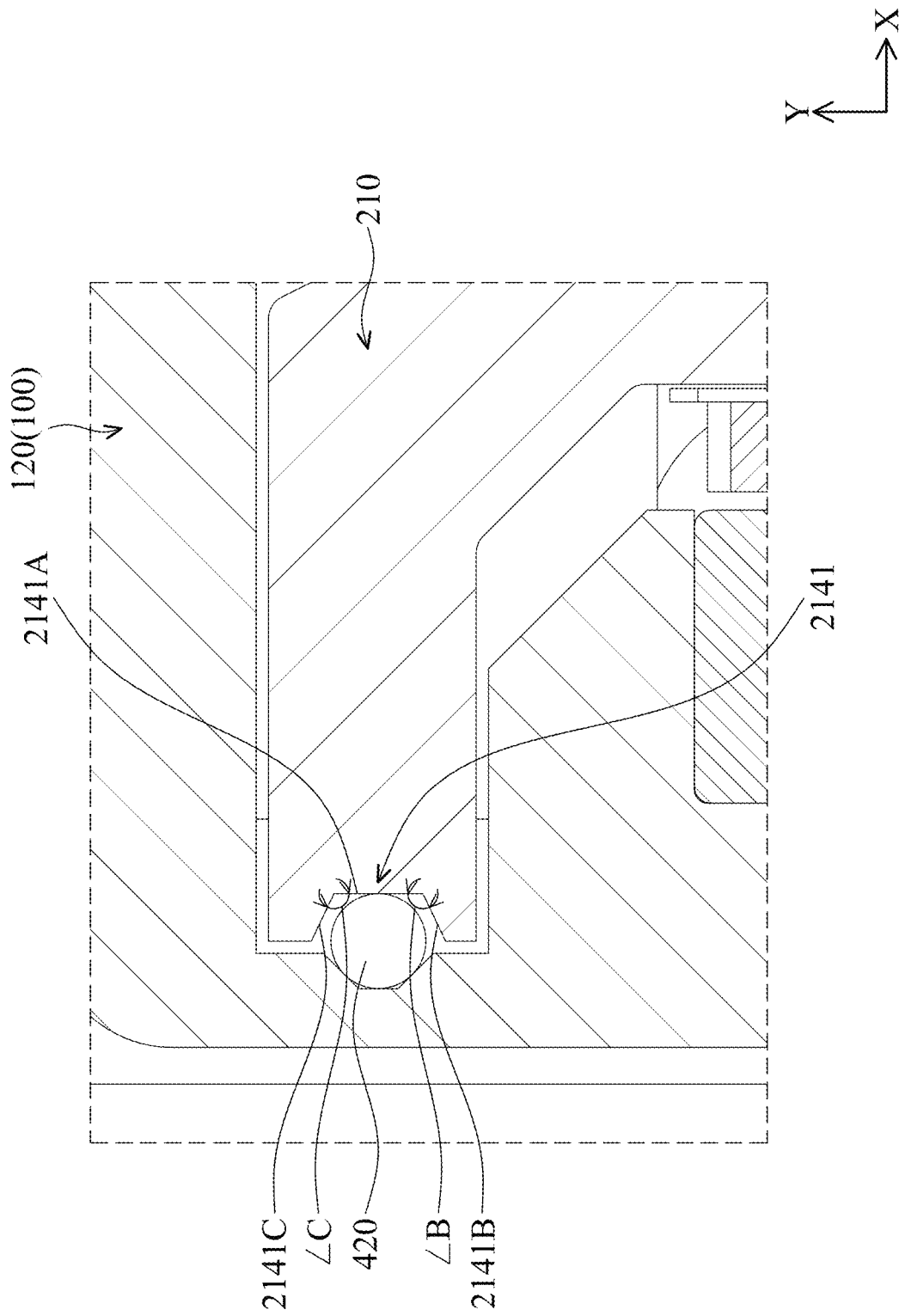
FIG. 5B is an enlarged view taken from block 5B in FIG. 4.

FIG. 5B is an enlarged view taken from block 5B in FIG. 4. As shown in FIG. 5B, the second contact portion 2141 contacts the second support component 420. The second contact portion 2141, which is a channel for accommodating the second support component 420, includes a contact portion surface 2141A and two surfaces 2141B and 2141C.

The contact portion surface 2141A is located between the two surfaces 2141B, 2141C. An included angle ∠B is formed between the contact portion surface 2141A and the surface 2141B, and the included angle ∠B may be an angle between 0° and 180° according to design requirements. An included angle ∠C is formed between the contact portion surface 2141A and the surface 2141C, and the included angle ∠C may be an angle between 0° and 180° according to design requirements. According to some embodiments of the present disclosure, the included angle ∠B is equal to the included angle ∠C.

When viewed along the Z-axis, the second support component 420 has one contact point with the contact portion surface 2141A, and there is no contact between the second support component 420 and the surfaces 2141B, 2141C.

Under the different configurations between the first contact portion 2131 and the second contact portion 2141, the first holder 210 may contact the support assembly 400 in a less restricted way of degrees of freedom. Therefore, the first holder 210 has better performance when moving relative to the fixed portion 100 to achieve auto-focusing (for example, the smoothness of the first holder 210 when moving is improved, and the risk of abnormal movement (for example, getting stuck) of the first holder 210 relative to the fixed portion 100 is reduced).

Figure 6:
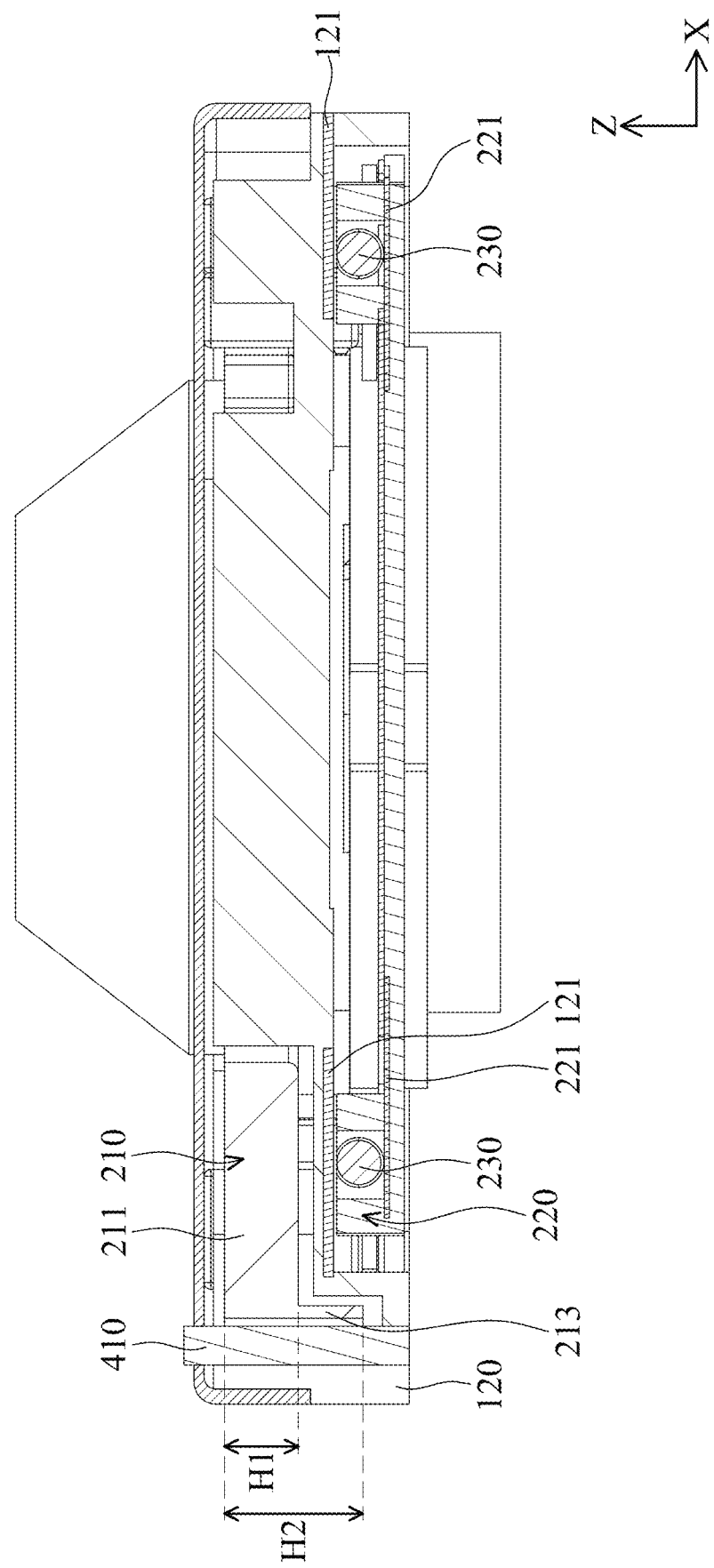
FIG. 6 is a cross-sectional side view of the optical component driving mechanism taken along line S-S' of FIG. 1, according to some embodiments of the present disclosure.

FIG. 6 is a cross-sectional side view of the optical component driving mechanism 10 taken along line S-S' of FIG. 1, according to some embodiments of the present disclosure. As shown in FIG. 6, the height H1 of the protruding portion 211 in the Z-axis is less than the height H2 of the extending portion 213 in the Z-axis. Although not shown, the height of the protruding portion 212 (FIG. 3) in the Z-axis is less than the height of the extending portion 214 (FIG. 3) in the Z-axis in the same way.

Since the height H1 of the protruding portions 211 and 212 is smaller than the height H2 of the extending portions 213 and 214, there is a space under the frame 120 to accommodate the second holder 220. Thus, the bottom of the second holder 220 does not exceed the bottom of the fixed portion 100 (for example, bottom of frame 120) in the Z-axis. Compared to other optical component driving mechanisms having an optical component holder having a height H2 and including a photosensitive component holder, this configuration enables the optical component driving mechanism 10 of the present disclosure to have a less thickness in the Z-axis. Miniaturization may thereby be achieved. At the same time, thanks to the configuration of the extending portions 213 and 214 of the first holder 210 with the height H2, the extending portions 213 and 214 may have longer contact portions (channels contacting the support assembly) than other optical component driving mechanisms having a holder with a height H1. Therefore, the optical component driving mechanism 10 of the present disclosure may prevent the first holder 210 from turning over when being driven, thereby improving the performance of driving the optical component driving mechanism 10.

The frame metal sheets 121, the second holder metal sheets 221, and the second holder rolling components 230 can also be seen in FIG. 6. The second holder rolling components 230 are disposed between the frame metal sheets 121 and the second holder metal sheets 221. The second holder rolling component 230 contacts the frame metal sheet 121 and the second holder metal sheet 221. In this way, the frame 120 and the second holder 220 may be prevented from being damaged when the second holder rolling components 230 move, and the movement of the second holder rolling components 230 may also assist in reducing frictional force.

Figure 7:
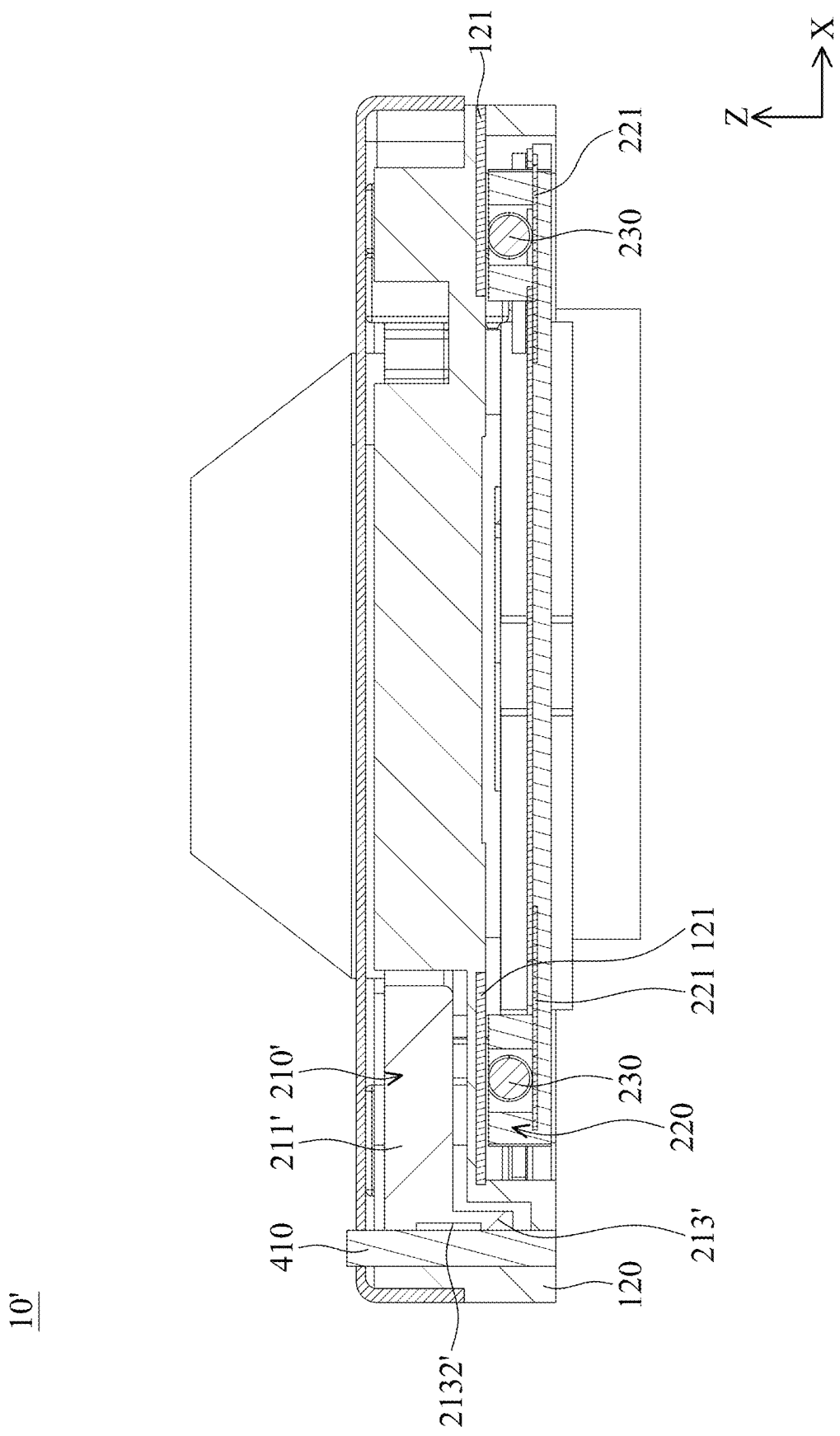
FIG. 7 is a cross-sectional side view of an optical component driving mechanism, according to another embodiment of the present disclosure.

FIG. 7 is a cross-sectional side view of an optical component driving mechanism 10', according to another embodiment of the present disclosure. As shown in FIG. 7, the extending portion 213' includes a groove 2132', and the groove 2132' does not contact the first support component 410. In other words, the groove 2132' exists where the extending portion 213' adjacent to the first support component 410. It should be understood that, although not shown, in this embodiment, the first holder 210' also includes another groove that does not contact the second support component 420 in the same manner. This configuration may reduce the frictional force between the first holder 210' and the support assembly 400, thereby improving the performance of the optical component driving mechanism 10'.

To sum up, in the present disclosure, the movable portion moves relative to the fixed portion via the support assembly. The use of the support assembly of the present disclosure instead of the spring sheets may enable the holder to hold optical components with large mass and size, thereby improving the performance of the optical component driving mechanism. Since the height of the extending portion of the present disclosure is greater than the height of the protruding portion, the optical component driving mechanism may have a thinner thickness. At the same time, compared with other optical component driving mechanisms with the same thickness, the optical component holder may be restrained from turning over. The first driving assembly and the support assembly of the present disclosure are disposed on the same side of the optical component driving mechanism. Thus, when the first holder moves along the optical axis, the distance between the first holder and the fixed portion perpendicular to the optical axis remains unchanged, so as to prevent the first holder from turning over when the first holder is driven. In the present disclosure, the first contact portion and the second contact portion have different configurations of contact portion surfaces. Therefore, the first holder may contact the support assembly in a less restricted way of degrees of freedom. The first holder thereby has better performance when moving relative to the fixed portion to achieve auto-focusing (for example, the smoothness of the first holder when moving is improved, and the risk of abnormal movement (for example, getting stuck) of the first holder relative to the fixed portion is reduced).

The ordinal numbers in this specification and the claim, such as "first", "second", etc., do not have a sequential relationship between each other, and they are only used to distinguish two different components with the same name.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. An optical component driving mechanism, comprising:
   a first holder, connected to a first optical component with an optical axis;
   a fixed portion, wherein the first holder is movable relative to the fixed portion;
   a first driving assembly, configured to drive the first holder to move relative to the fixed portion; and
   a support assembly, wherein the first holder is movable relative to the fixed portion via the support assembly;
   wherein the first holder comprises a first side surface, the first driving assembly comprises a first driving element disposed on the first side surface, a normal direction of the first side surface is perpendicular to the optical axis, when viewed along a direction perpendicular to the normal direction and the optical axis, the support assembly does not overlap the first driving element, and a distance between the first driving element and the optical axis is smaller than a distance between the support assembly and the optical axis.

2. The optical component driving mechanism as claimed in claim 1, wherein the first holder comprises a protruding portion and an extending portion, wherein an extending direction of the protruding portion is perpendicular to an extending direction of the extending portion.

3. The optical component driving mechanism as claimed in claim 2, wherein the extending direction of the protruding portion is perpendicular to the optical axis, and the extending direction of the extending portion is parallel to the optical axis.

4. The optical component driving mechanism as claimed in claim 2, wherein the first holder further comprises another protruding portion, wherein the protruding portion and the another protruding portion are located on two sides of the first driving assembly.

5. The optical component driving mechanism as claimed in claim 2, wherein when viewed in a direction that is perpendicular to the optical axis, a height of the extending portion is greater than a height of the protruding portion.

6. The optical component driving mechanism as claimed in claim 2, further comprising a second holder, wherein the extending portion at least partially overlaps the protruding portion and the second holder when viewed in a direction that is perpendicular to the optical axis.

7. The optical component driving mechanism as claimed in claim 2, wherein the extending portion comprises a groove, and the groove does not contact the support assembly.

8. The optical component driving mechanism as claimed in claim 2, wherein the support assembly comprises a first support component and a second support component, and the first support component and the second support component each extend in a direction that is parallel to the optical axis.

9. The optical component driving mechanism as claimed in claim 8, wherein the extending portion has a first contact portion and a second contact portion, wherein the first contact portion contacts the first support component, and the second contact portion contacts the second support component.

10. The optical component driving mechanism as claimed in claim 9, wherein the first contact portion is a V-shaped channel.

11. The optical component driving mechanism as claimed in claim 9, wherein the first contact portion is a channel, and the first contact portion comprises two contact portion surfaces.

12. The optical component driving mechanism as claimed in claim 11, wherein an included angle is formed between the contact portion surfaces of the first contact portion.

13. The optical component driving mechanism as claimed in claim 9, wherein the second contact portion is a channel, and the second contact portion comprises a contact portion surface and two surfaces, and the second support component contacts the contact portion surface of the second contact portion, and the second support component does not contact the two surfaces of the second contact portion.

14. The optical component driving mechanism as claimed in claim 13, wherein the contact portion surface of the second contact portion and the two surfaces respectively form two included angles with equal angles.

15. The optical component driving mechanism as claimed in claim 1, wherein the optical component driving mechanism substantially has a rectangular shape when viewed along the optical axis, and the first driving assembly and the support assembly are located on the same side of the optical component driving mechanism.

16. The optical component driving mechanism as claimed in claim 1, wherein the shortest distance between the first driving assembly and the optical axis is smaller than the shortest distance between the support assembly and the optical axis.

17. The optical component driving mechanism as claimed in claim 1, further comprising a second holder, wherein a bottom of the second holder does not exceed a bottom of the fixed portion in a direction of the optical axis.

18. The optical component driving mechanism as claimed in claim 1, wherein the first driving assembly further comprises a second driving element and a third driving element, wherein the first driving element comprises a first coil, the second driving element comprises a first magnetic component, the third driving element comprises a first magnetically permeable component, the first magnetic component is disposed on the fixed portion, and the first coil and the first magnetically permeable component are disposed on the first holder.

19. The optical component driving mechanism as claimed in claim 18, further comprising a first circuit member comprising a first portion and a second portion, wherein the first portion and the second portion are disposed on two different sides of the first holder.

20. The optical component driving mechanism as claimed in claim 19, wherein the first portion of the first circuit member is disposed between the first coil and the first magnetically permeable component.

* * * * *